United States Patent
Wang et al.

(10) Patent No.: US 9,163,976 B2
(45) Date of Patent: Oct. 20, 2015

(54) HIGH ACCURACY LEVEL TRANSDUCER

(71) Applicant: FINETEK CO., LTD., New Taipei (TW)

(72) Inventors: Jen-Shun Wang, New Taipei (TW);
Chi-Fan Liao, New Taipei (TW);
Jun-Da Chen, New Taipei (TW);
Shih-Ying Wang, New Taipei (TW);
Chao-Kai Cheng, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 168 days.

(21) Appl. No.: 14/086,335

(22) Filed: Nov. 21, 2013

(65) Prior Publication Data

US 2014/0352425 A1    Dec. 4, 2014

(30) Foreign Application Priority Data

Jun. 4, 2013 (TW) .............................. 102119697 A

(51) Int. Cl.
*G01F 23/00* (2006.01)
*G01F 23/296* (2006.01)

(52) U.S. Cl.
CPC .................................. *G01F 23/2966* (2013.01)

(58) Field of Classification Search
None
See application file for complete search history.

(56) References Cited

U.S. PATENT DOCUMENTS

| | | | | |
|---|---|---|---|---|
| 5,408,168 A | * | 4/1995 | Pfandler | 318/642 |
| 5,709,558 A | * | 1/1998 | Dreyer et al. | 439/95 |
| 5,743,134 A | * | 4/1998 | Dreyer | 73/290 V |
| 5,895,848 A | * | 4/1999 | Wilson et al. | 73/290 V |
| 6,389,891 B1 | * | 5/2002 | D'Angelico et al. | 73/290 V |
| 6,644,116 B2 | * | 11/2003 | Getman et al. | 73/290 V |
| 8,456,060 B2 | * | 6/2013 | Turner | 310/328 |
| 2003/0010114 A1 | * | 1/2003 | Getman et al. | 73/290 R |
| 2004/0056612 A1 | * | 3/2004 | Kuhny et al. | 318/116 |
| 2010/0327700 A1 | * | 12/2010 | Turner | 310/342 |
| 2011/0001395 A1 | * | 1/2011 | Turner et al. | 310/328 |
| 2011/0012480 A1 | * | 1/2011 | Turner | 310/346 |

FOREIGN PATENT DOCUMENTS

WO   WO 2009110986 A1 *  9/2009
WO   WO 2009114073 A1 *  9/2009

* cited by examiner

*Primary Examiner* — Andre Allen
(74) *Attorney, Agent, or Firm* — patenttm.us

(57) ABSTRACT

A level transducer has a power supply module, a tuning fork module, a sensing-phase corrector and a controller. The tuning fork module has a tuning fork, at least one piezoelectric driving element, and at least one piezoelectric sensing element. The at least one piezoelectric driving element and the at least one piezoelectric sensing element are stacked on each other, and are mounted on the tuning fork. The power supply module is electrically connected and outputs a voltage to the at least one piezoelectric driving element to deform the at least one piezoelectric driving element. The at least one piezoelectric sensing element is extruded and outputs a voltage signal. The sensing-phase corrector obtains the voltage signal and outputs a clock signal to feedback control the voltage on the at least one piezoelectric driving element to optimize a deformation frequency of each piezoelectric element.

20 Claims, 6 Drawing Sheets

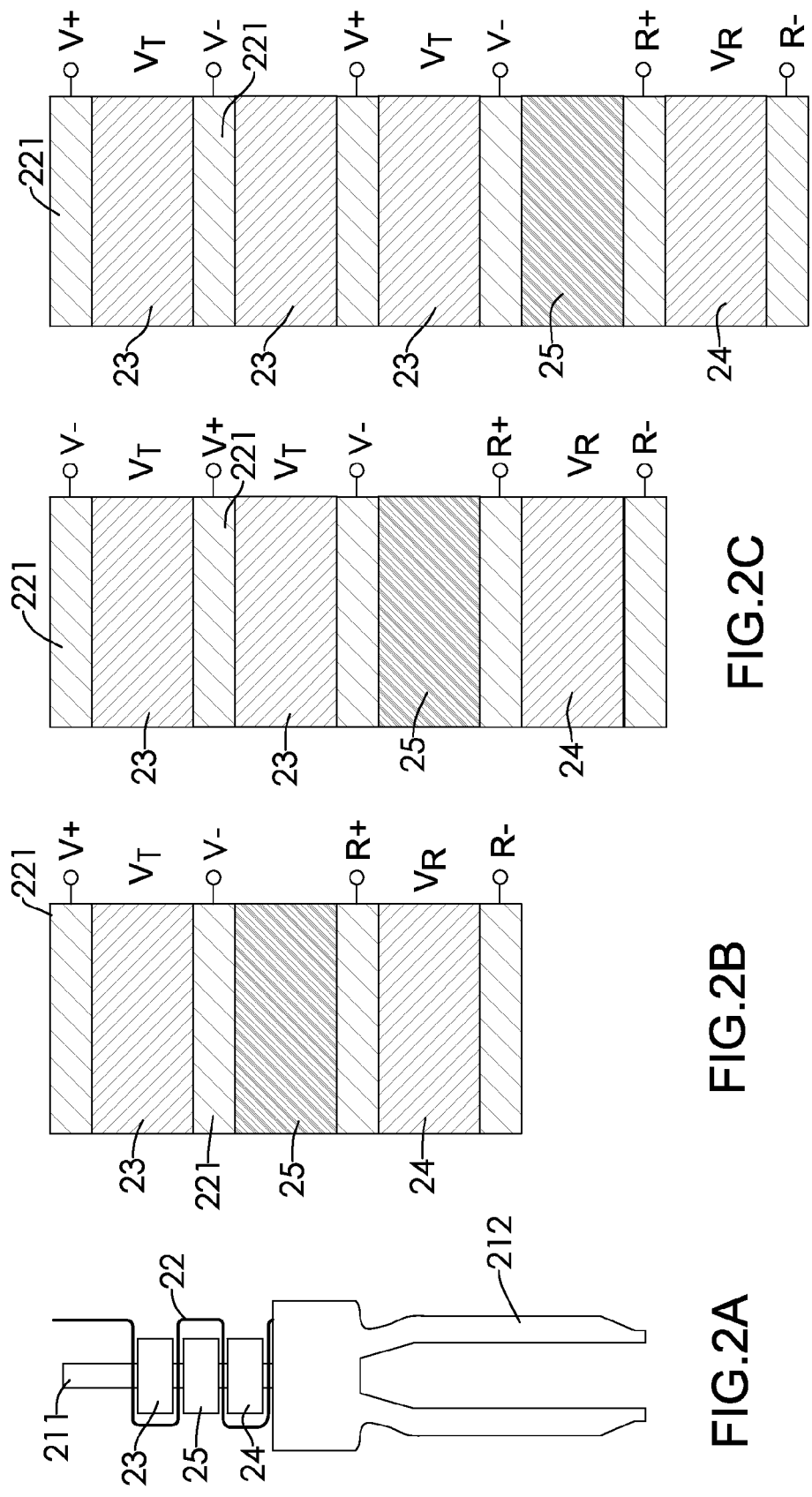

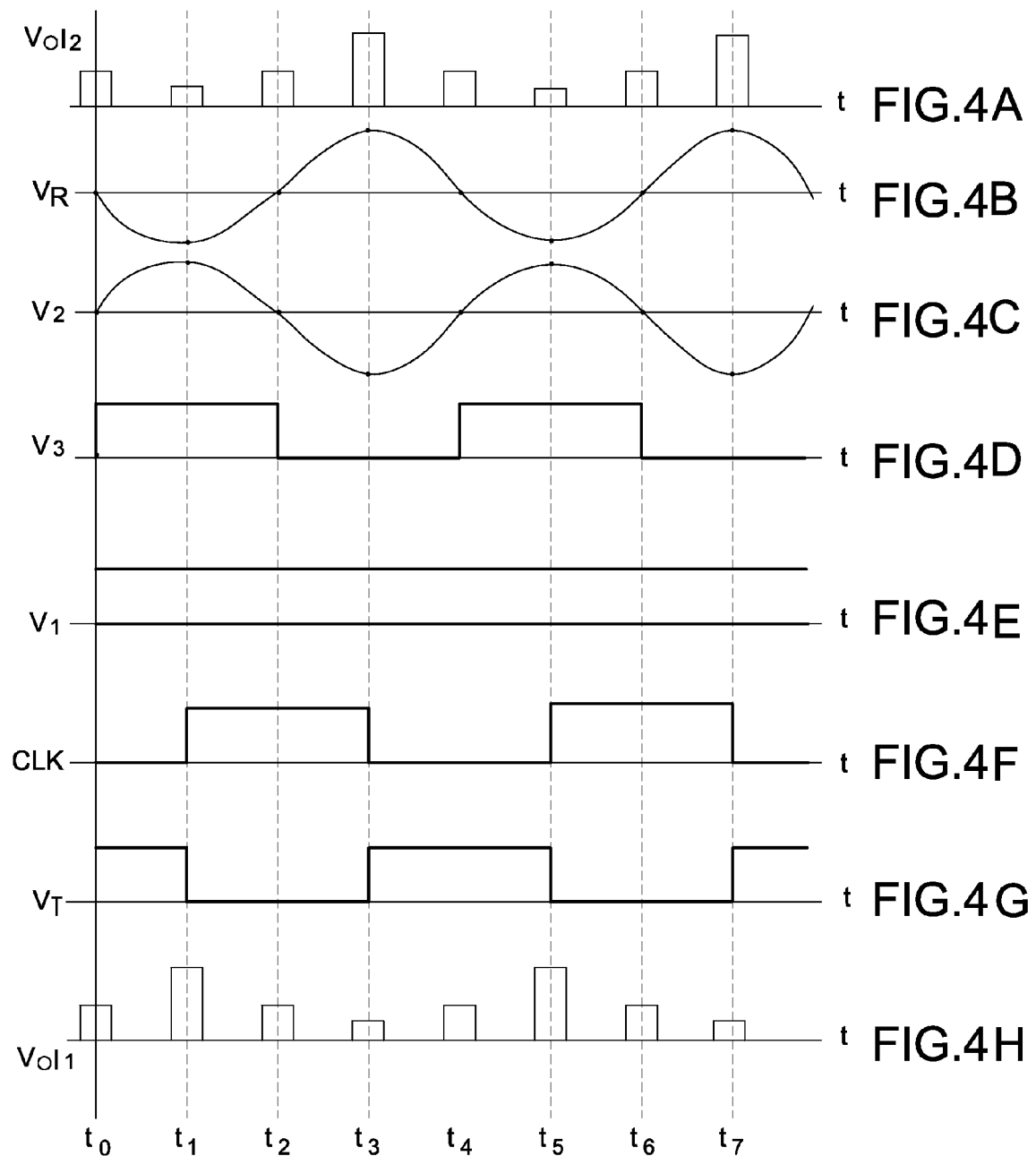

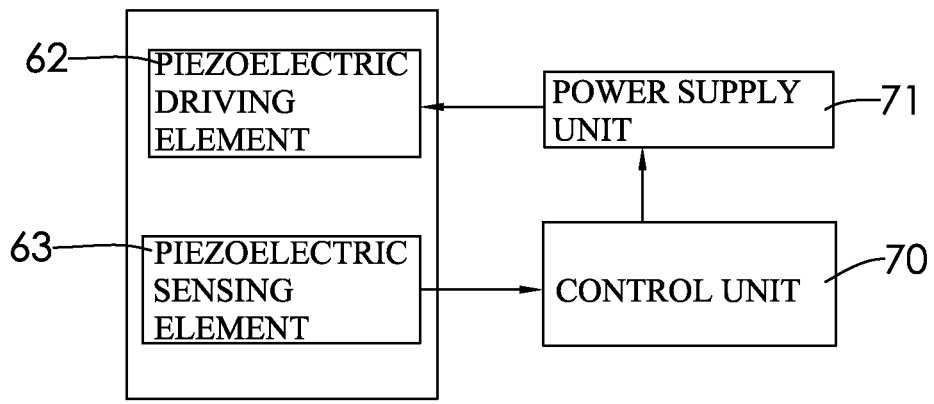
FIG.6
PRIOR ART
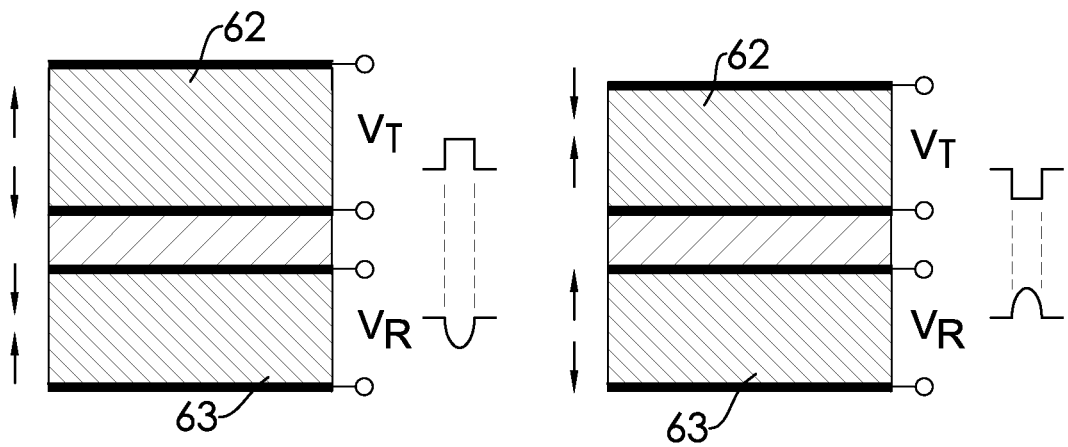
FIG.7A
PRIOR ART
FIG.7B
PRIOR ART

HIGH ACCURACY LEVEL TRANSDUCER

BACKGROUND OF THE INVENTION

1. Field of the Invention

The present invention relates to a level transducer and more particularly to a level transducer having a self-modulation function to increase accuracy of the level transducer.

2. Description of Related Art

Level transducers are commonly used in many industries such as food industries, chemical industries, and petrochemical industries to monitor a level change of material stored in a tank to confirm amount or inventory status of the material.

With reference to FIGS. 5 and 6, a conventional level transducer comprises a tuning fork unit 60, a control unit 70 and a power supply unit 71. The tuning fork unit 60 has a tuning fork 61, a piezoelectric driving element 62 and a piezoelectric sensing element 63, wherein the piezoelectric driving element 62 and the piezoelectric sensing element 63 are sleeved on the tuning fork 60, and the piezoelectric driving element 62 is stacked on the piezoelectric sensing element 63. The control unit 70 is electrically connected to the power supply unit 71, wherein the control unit 70 and the power supply unit 71 are respectively connected to the piezoelectric sensing element 63 and the piezoelectric driving element 62.

When the level transducer is in use, the power supply unit 71 produces a square wave driving voltage signal $V_T$ to the piezoelectric driving element 62. The piezoelectric driving element 62 obtains the driving voltage signal $V_T$ and deforms. The tuning fork 61 vibrates with a deformation of the piezoelectric driving element 62. Since the tuning fork 61 is inserted in a stored material, a vibration frequency of the tuning fork 61 is influenced by the nature and a level of the stored material, and the vibration frequency of the tuning fork 61 further influences a frequency of the deformation of the piezoelectric driving element 62.

With further reference to the FIG. 7A, when in a positive voltage period of a function cycle of the power supply unit 71, the piezoelectric driving element 62 obtains a positive voltage and expands. The piezoelectric sensing element 63 is extruded due to the expansion of the piezoelectric driving element 62 and shrinks.

With further reference to the FIG. 7B, when in a negative voltage period of the function of the power supply unit 71, the piezoelectric driving element 62 obtains a negative voltage and shrinks. The piezoelectric sensing element 63 expands with the shrinking piezoelectric driving element 62.

A sine wave sensing voltage signal $V_R$ is produced by the piezoelectric sensing element 63 by a deformation of the piezoelectric sensing element 63 and is sent to the control unit 70. A frequency of the sensing voltage signal $V_R$ is based on a frequency of the deformation of the piezoelectric sensing element 63. When the tuning fork 61 is exposed in air, the frequency of the sensing voltage signal $V_R$ approximately equals a frequency of the driving voltage signal $V_T$. When the tuning fork 61 is inserted in a stored material, though the frequency of the driving voltage signal $V_T$ is not changed, the vibration of the tuning fork 61 slows down due to a resistance of the stored material, and the frequency of the deformation of the piezoelectric driving element 62 is also decreased. Therefore, the frequency of the deformation of the piezoelectric sensing element 63 and the frequency of the sensing voltage signal $V_R$ are both decreased. The decreases of the sensing voltage signal $V_R$ are based on the nature and a level of a stored material in which the tuning fork 61 inserted, such that the control unit 70 can obtain the nature and the level of the stored material by calculating the sensing voltage signal $V_R$.

By the above described, the deformation of the piezoelectric driving element 62 is controlled by the driving voltage signal $V_T$, and the frequency of the deformation of the piezoelectric driving element 62 can be changed by adjusting the driving voltage signal $V_T$. However, when the function cycle of the voltage signal $V_T$ transits from the positive voltage period to the negative voltage period, the piezoelectric driving element 62 keeps expanding at the transition moment, and thus, the piezoelectric element 62 does not shrink immediately at the transition moment due to inertia of the expanding. Thus, the vibration of the tuning fork 61 becomes weaker, and oscillation amplitude of the sensing voltage signal $V_R$ becomes smaller. The control unit 70 obtains sensing results of the stored material based on the inaccurate sensing voltage signal $V_R$, and thus, accuracy of the sensing results obtained by the control unit 70 is reduced.

SUMMARY OF THE INVENTION

The main objective of the invention is to provide a level transducer having a self-modulation function of adjusting a phase of a square wave driving voltage signal to keep piezoelectric elements deforming at appropriate moments to increase accuracy of the level transducer.

The level transducer comprises a power supply module, a tuning fork module, a sensing-phase corrector and a controller. The power supply module produces an adjustable DC voltage. The tuning fork module has a tuning fork, at least one piezoelectric driving element, and at least one piezoelectric sensing element. The at least one piezoelectric driving element and the at least one piezoelectric sensing element are stacked on each other. Each one of the at least one piezoelectric driving element has two electrode surfaces and one of the two electrode surfaces is electrically connected to the power supply module, wherein a voltage between the two electrode surfaces of the at least one piezoelectric driving element is a square wave driving voltage signal. When the at least one piezoelectric sensing element deforms, the at least one piezoelectric sensing element produces a sine wave sensing voltage signal. The sensing-phase corrector is electrically connected to the tuning fork module to obtain the sensing voltage signal, and has a sine wave signal processor and a phase shifter, wherein the sine wave signal processor produces a reversed sensing voltage signal based on the sensing voltage signal. The sensing-phase corrector converts the sensing voltage signal to a clock signal having a phase difference of 90 degrees relative to the sensing voltage signal, and outputs the clock signal to the other electrode surface of the at least one piezoelectric driving element. The controller has a calculation function, and is electrically connected to the power supply module, the tuning fork module and the sensing-phase corrector, wherein the controller obtains a sensing result based on the square wave driving voltage signal on the at least one piezoelectric driving element, the reversed sensing voltage signal by sine wave signal processor and the clock signal produced by the sensing-phase corrector.

The sensing-phase corrector produces the clock signal having the phase difference of 90 degrees relative to the sensing voltage and outputs the clock signal to one of the two electrode surfaces of the at least one piezoelectric driving element. The other electrode surface of the at least one piezoelectric driving element obtains the DC voltage from the power supply module, that is, a square wave driving signal having a phase difference of 90 degrees relative to the sensing voltage is formed on the at least one piezoelectric driving element. The at least one piezoelectric driving element obtains the square wave driving signal and deforms, wherein when the expanding of the at least one piezoelectric driving element stops, the shrinking of the at least one piezoelectric sensing element also stops simultaneously. On the contrary, when the shrinking of the at least one piezoelectric driving element stops, the expanding of the at least one piezoelectric sensing element also stops simultaneously. That is, only when the deformation of the at least one piezoelectric driving element stops, the at least one piezoelectric driving element obtains a reversed driving signal to prevent the inertia of the deformation from interfering with the sensing result. Therefore, the accuracy of the measuring with the level transducer in accordance with the present invention is increased.

BRIEF DESCRIPTION OF THE DRAWINGS

FIG. 2A is a front view of a first embodiment of a tuning fork module of the level transducer in FIG. 1;

FIG. 2B is a side view in partial section of the tuning fork module in FIG. 2A;

FIG. 2C is a side view in partial section of a second embodiment of a tuning fork module of the level transducer in FIG. 1;

FIG. 2D is a side view in partial section of a third embodiment of a tuning fork module of the level transducer in FIG. 1;

FIG. 4A shows a volume change of at least one piezoelectric sensing element of the level transducer in FIG. 1;

FIG. 4B is a waveform chart of a sine wave sensing voltage signal of the level transducer in FIG. 1;

FIG. 4C is a wave form chart of the sine wave sensing voltage signal in FIG. 4B being phase shifted for 180 degrees;

FIG. 4D is a wave form chart of a square wave signal converted from the sine wave sensing voltage signal in FIG. 4C;

FIG. 4E is a wave form chart of a DC voltage produced by a power supply module in FIG. 1;

FIG. 4F is a waveform chart of a clock signal having a phase delay of 90 degrees relative to the square wave signal;

FIG. 4G is a waveform chart of a square wave driving voltage signal of the level transducer in FIG. 1;

FIG. 4H shows a volume change of the at least one piezoelectric driving element of the level transducer in FIG. 1;

FIG. 6 is a circuit block diagram of the level transducer in FIG. 5;

FIG. 7A shows an expanding of a piezoelectric driving element and a shrinking of a piezoelectric sensing element of the level transducer in FIG. 5; and FIG. 7B shows a shrinking of the piezoelectric driving element and an expanding of the piezoelectric sensing element of the level transducer in FIG. 5

DETAILED DESCRIPTION OF THE PREFERRED EMBODIMENTS

Figure 1:
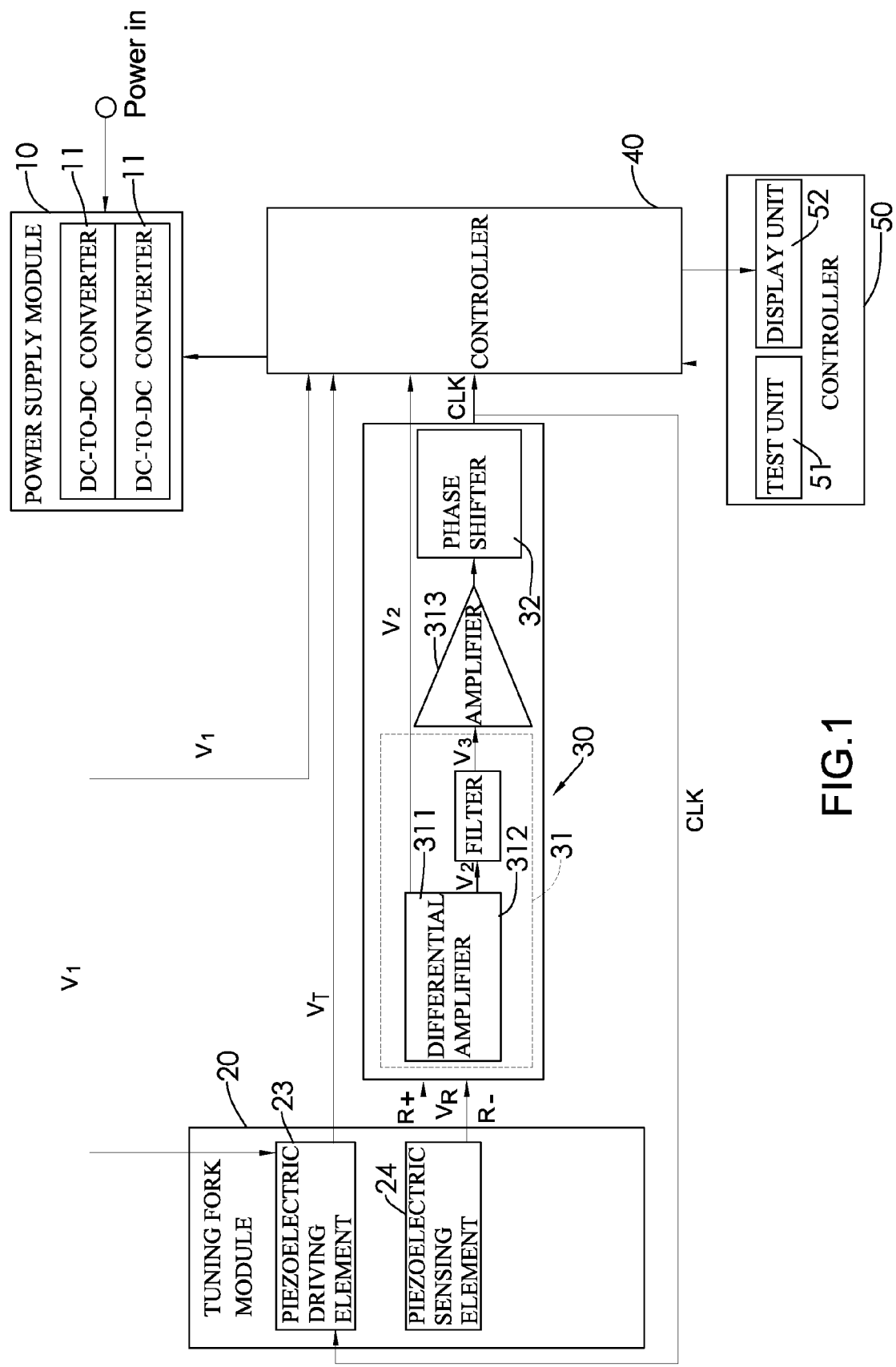
FIG. 1 is a circuit block diagram of a level transducer in accordance with the present invention.

With reference to FIGS. 1, 2A and 2B, a level transducer in accordance with the present invention comprises a power supply module 10, a tuning fork module 20, a sensing-phase corrector 30 and a controller 40.

The power supply module 10 comprises multiple DC-to-DC converters 11 adapted for being electrically connected to a power source power-in and respectively outputting a DC voltage $V_1$, wherein a voltage level of the DC voltage $V_1$ is adjustable.

The tuning fork module 20 has a tuning fork 21, at least one piezoelectric driving element 23, and at least one piezoelectric sensing element 24. Each one of the at least one piezoelectric driving element 23 has two electrode surfaces V+, V−, and each one of the at least one piezoelectric sensing element 24 also has two electrode surfaces R+, R−. The electrode surface V+ of the at least one piezoelectric driving element 23 is electrically connected to the power supply module 10. When the at least one piezoelectric sensing element 24 deforms, the at least one piezoelectric sensing element 24 outputs a sine wave sensing voltage signal $V_R$.

With further reference to FIGS. 1 and 4, the sensing-phase corrector 30 has two input terminals, an output terminal, a sine wave processor 31 and a phase shifter 32. The two input terminals of the sensing-phase corrector 30 are respectively and electrically connected to the two electrode surfaces R+, R− of the at least one piezoelectric sensing element 24 to obtain the sine wave sensing voltage signal $V_R$. The sine wave processor 31 obtains the sine wave sensing voltage signal $V_R$ and converts the sine wave sensing voltage signal $V_R$ to a square wave signal $V_3$. The phase shifter 32 is electrically connected to the sine wave processor 31 to obtain the square wave signal $V_3$, and outputs a clock signal CLK having a phase difference of 90 degrees relative to the sensing voltage signal $V_R$ to the output terminal of the sensing-phase corrector 30, wherein the output terminal is electrically connected to the other electrode surface V− of the at least one piezoelectric driving element 23. Therefore, a voltage difference between the two electrode surfaces V+, V− of the at least one piezoelectric driving element 23 forms a square wave driving voltage signal $V_T$ to the at least one piezoelectric driving element 23. In a preferred embodiment, the sine wave processor 31 further has a differential amplifier 311, a filter 312 and an amplifier 313, wherein the differential amplifier 311, the filter 312 and the amplifier 313 are sequentially connected in series. The differential amplifier 311 obtains and reverses the sensing voltage signal $V_R$, and then outputs a reversed sensing voltage signal $V_2$ to the filter 312, wherein the differential amplifier 311 is electrically connected to the controller 40. The reversed sensing voltage signal $V_2$ is converted to a square wave signal $V_3$ by the filter 312 and the amplifier 313, and is outputted to the phase shifter 32.

The controller 40 has a calculation function and is electrically connected to the power supply module 10, the tuning fork module 20 and the sensing-phase corrector 30. The controller 40 obtains a sensing result based on the square wave driving voltage signal $V_T$ on the at least one piezoelectric driving element 23, the reversed sensing voltage signal $V_2$ produced by the sine wave processor 31 and the clock signal CLK produced by the phase shifter 32. In a preferred embodiment, the controller 40 is further electrically connected to the differential amplifier 311 to obtain the reversed sensing voltage signal $V_2$ produced by the differential amplifier 31.

With reference to FIGS. 1, 2B and 4A to 4F, a vertical axis in FIG. 4A represents a volume of the at least one piezoelectric sensing element 24; a vertical axis in FIG. 4B represents a voltage of the sine wave sensing voltage signal $V_R$; a vertical axis in FIG. 4C represents a voltage of the reversed sensing voltage signal $V_2$; a vertical axis in FIG. 4D represents a voltage of the square wave signal $V_3$; a vertical axis in FIG. 4E represents a voltage of the DC voltage $V_1$; a vertical axis in FIG. 4F represents a voltage of the clock signal CLK; a vertical axis in FIG. 4G represents a voltage of the square wave driving voltage signal $V_T$; a vertical axis in FIG. 4H represents a volume of the at least one piezoelectric driving element 23, wherein all horizontal axes represent time.

A signal processing of the level transducer in accordance with the present invention is described as follows. When the at least one piezoelectric sensing element 24 is extruded by the at least one piezoelectric driving element 23 and a volume $Vol_2$ of the at least one piezoelectric driving element 23 changes as shown in FIG. 4A, the at least one piezoelectric sensing element 24 produces the sine wave sensing voltage signal $V_R$ as shown in FIG. 4B. Simultaneously, the sensing-phase corrector 30 obtains the sensing voltage signal $V_R$, and the differential amplifier 311 reverses the sensing voltage signal $V_R$ and outputs the reversed sensing voltage signal $V_2$ as shown in FIG. 4C. The filter 312 and the amplifier 313 filter and amplify the reversed sensing voltage signal $V_2$, and then outputs the square wave signal $V_3$ as shown in FIG. 4D. The phase shifter 32 obtains and shifts the square wave signal $V_3$ for 90 degrees, and then outputs the clock signal CLK as shown in FIG. 4F.

The sensing-phase corrector 30 outputs the clock signal CLK to the electrode surface V− of the at least one piezoelectric driving element 23, wherein the other electrode surface V+ of the at least one piezoelectric driving element 23 is electrically connected to the power supply module 10, thus, a voltage difference as shown in FIG. 4G is formed between the two electrode surfaces V+, V− of the at least one piezoelectric driving element 23, wherein the voltage difference between the two electrode surfaces V+, V− is the square wave driving voltage signal $V_T$. A phase difference between the square wave driving voltage signal $V_T$ and the square wave signal $V_3$ as shown in FIG. 4D is 90 degrees, and a phase difference between the square wave driving voltage signal $V_T$ and the sensing voltage signal $V_R$ as shown in FIG. 4B is also 90 degrees.

With reference to FIGS. 4A and 4H, when at the time point $t_0$, the volume of the at least one piezoelectric driving element 23 and the volume of the at least one piezoelectric sensing element 24 both maintain at original states. When at the time point $t_1$, the at least one piezoelectric driving element 23 expands its volume to a maximum state, and the at least one piezoelectric sensing element 24 shrinks its volume to a minimum state. When at the time point $t_2$, the volume of the at least one piezoelectric driving element 23 and the volume of the at least one piezoelectric sensing element 24 both restore to the original states. When at the time point $t_3$, the at least one piezoelectric driving element 23 shrinks its volume to a minimum state, and the at least one piezoelectric sensing element 24 expands its volume to a maximum state.

When at the time point $t_4$, the volume of the at least one piezoelectric driving element 23 and the volume of the at least one piezoelectric sensing element 24 both restore to the original states. When at the time point $t_5$, the at least one piezoelectric driving element 23 expands its volume to the maximum state, and the at least one piezoelectric sensing element 24 shrinks its volume to the minimum state. When at the time point $t_6$, the volume of the at least one piezoelectric driving element 23 and the volume of the at least one piezoelectric sensing element 24 both restore to the original states. When at the time point $t_7$, the at least one piezoelectric driving element 23 shrinks its volume to the minimum state, and the at least one piezoelectric sensing element 24 expands its volume to the maximum state.

When the at least one piezoelectric driving element 23 and the at least one piezoelectric sensing element 24 both deform with the above disclosed deforming frequency, the deformation forces working on the at least one piezoelectric driving element 23 and the at least one piezoelectric sensing element 24 are in the same direction, and only when the deformation forces are depleted, the at least one piezoelectric driving element 23 and the at least one piezoelectric sensing element 24 obtain deformation forces in reverse directions. Therefore, the deformation forces working on the at least one piezoelectric driving element 23 and the at least one piezoelectric sensing element 24 are not counteracted by deformation forces in reverse directions, such that the accuracy of the sensing result is increased.

With reference to FIGS. 2A and 2B, a first preferred embodiment of a tuning fork module 20 of the level transducer in accordance with the present invention comprises a tuning fork 21, a flexible circuit board 22, a piezoelectric driving element 23 having two electrode surfaces, a piezoelectric sensing element 24 having two electrode surfaces, and an electrical insulation sheet 25. The tuning fork 21 has a column 211 and a fork 212 connected to the column 211, wherein the fork 212 is adapted for being inserted in the stored material.

The flexible circuit board 22 has multiple conductive sheets 221 and is folded wavy to form multiple creases. The flexible circuit board 22 is electrically connected to the power supply module 10 and the sensing-phase corrector 30. The multiple conductive sheets 221 are respectively mounted on sides of the multiple creases, and each conductive sheet 221 has two sides. The column 211 of the tuning fork 21 axially penetrates through the multiple creases.

The piezoelectric driving element 23 and the piezoelectric sensing element 24 are respectively mounted in the multiple creases and between the multiple conductive sheets 221.

The electrical insulation sheet 25 is mounted between the piezoelectric driving element 23 and the piezoelectric sensing element 24.

The electrode surface V+ of the piezoelectric driving element 23 is electrically connected to the power supply module 10 through the multiple conductive sheets 221. The other electrode surface V− of the piezoelectric driving element 23 is electrically connected to the output terminal of the sensing-phase corrector 30 through the multiple conductive sheets 221.

The voltage applied to the electrode surface V+ is the fixed DC voltage $V_1$. The voltage applied to the other electrode surface V− is the clock signal CLK, which changes with time. A voltage difference formed between the electrode surfaces V+ and V− is produced as the square wave driving voltage signal $V_T$ causing the deformation of the piezoelectric driving element 23.

The two electrode surfaces R+, R− of the piezoelectric sensing element 24 are respectively and electrically connected to the two input terminals of the sensing-phase corrector 30 through the multiple conductive sheets 221. When the piezoelectric sensing element 24 deforms, a voltage difference formed between the two electrode surfaces R+, R− is produced as the sine wave sensing voltage signal $V_R$. Then, the sensing-phase corrector 30 obtains the sine wave sensing voltage signal $V_R$. The electrical insulation sheet 25 is mounted between the piezoelectric driving element 23 and the piezoelectric sensing element 24 to separate the two piezoelectric elements to prevent the sine wave sensing voltage signal $V_R$ from interfering with the piezoelectric driving element 23.

With reference to FIG. 2C, a second preferred embodiment of a tuning fork module 20 of the level transducer in accordance with the present invention comprises a tuning fork 21, a flexible circuit board 22, two piezoelectric driving elements 23 each having two electrode surfaces, a piezoelectric sensing element 24 having two electrode surfaces, and an electrical insulation sheet 25.

The electrode surface V+ of each piezoelectric driving element 23 is electrically connected to the power supply module 10 through the conductive sheet 221 mounted between the two piezoelectric driving elements 23. The other electrode surface V− of each piezoelectric driving element 23 is electrically connected to the output terminal of the sensing-phase corrector 30 through the multiple conductive sheets 221.

The two electrode surfaces R+, R− of the piezoelectric sensing element 24 are respectively and electrically connected to the two input terminals of the sensing-phase corrector 30 through the multiple conductive sheets 221.

The electrical insulation sheet 25 is mounted between the piezoelectric sensing element 24 and the piezoelectric driving element 23 that is closer to the piezoelectric sensing element 24 than the other piezoelectric driving element 23, so as to prevent the sine wave sensing voltage $V_R$ from interfering with the piezoelectric driving element 23.

In the second preferred embodiment, two of the electrode surfaces of the two piezoelectric driving elements 23 that have a same polarity are respectively connected to two sides of the conductive sheet 221 mounted between the two piezoelectric driving elements 23, such that the directions of the deformation forces working on the two piezoelectric driving elements 23 are the same. The deformation forces on the two piezoelectric driving elements 23 do not cancel each other out and the vibration intensity of the tuning fork 21 is maintained.

With reference to FIG. 2D, a third preferred embodiment of a tuning fork module 20 of the level transducer in accordance with the present invention comprises a tuning fork 21, a flexible circuit board 22, three piezoelectric driving elements 23 each having two electrode surfaces, a piezoelectric sensing element 24 having two electrode surfaces, and an electrical insulation sheet 25.

Two electrode surfaces of two of the three piezoelectric driving elements 23 that have a same polarity are respectively connected to two sides of the conductive sheet 221 mounted between said two piezoelectric driving elements 23. The electrode surface V+ of each piezoelectric driving element 23 is electrically connected to the power supply module 10 through the multiple conductive sheets 221. The other electrode surface V− of each piezoelectric driving element 23 is electrically connected to the output terminal of the sensing-phase corrector 30 through the multiple conductive sheets 221.

The two electrode surfaces R+, R− of the piezoelectric sensing element 24 are respectively and electrically connected to the two input terminals of the sensing-phase corrector 30 through the multiple conductive sheets 221.

The electrical insulation sheet 25 is mounted between the piezoelectric sensing element 24 and the piezoelectric driving element 23 that is closer to the piezoelectric sensing element 24 than the other two piezoelectric driving element 23.

In the third preferred embodiment, the electrode surfaces of two of the three piezoelectric driving elements 23 that have a same polarity are respectively connected to two sides of the conductive sheet 221 mounted between said two piezoelectric driving elements 23, such that the directions of the deformation forces working on the three piezoelectric driving elements 23 are the same. The deformation forces on the three piezoelectric driving elements 23 do not cancel each other out, and the vibration intensity of the tuning fork 21 is maintained.

Figure 3A:
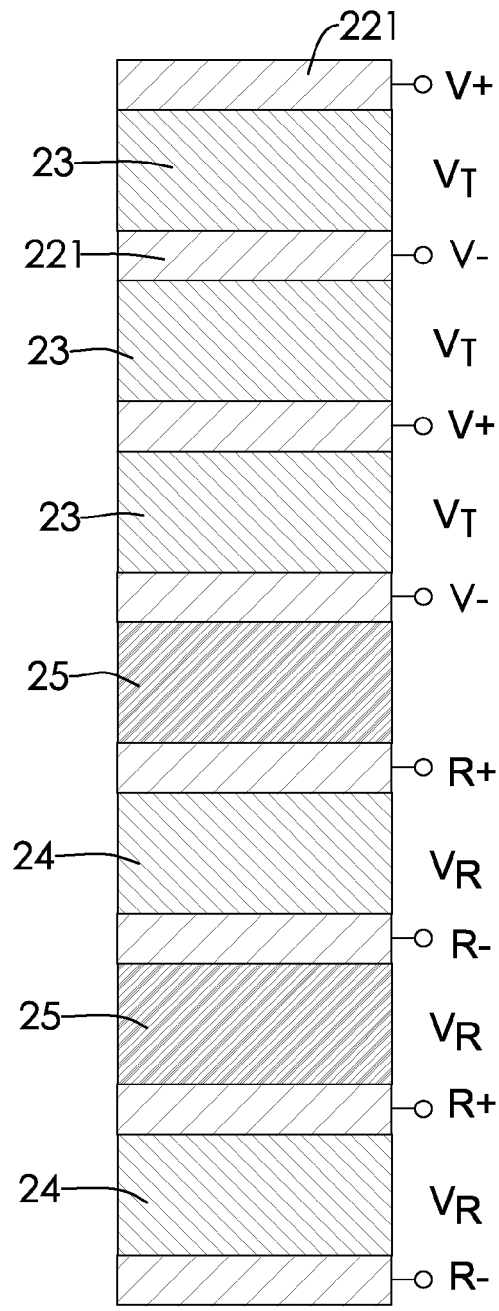
FIG. 3A is a side view in partial section of a fourth embodiment of a tuning fork module of the level transducer in FIG. 1.

With reference to FIG. 3A, a fourth preferred embodiment of a tuning fork module 20 of the level transducer in accordance with the present invention comprises a tuning fork 21, a flexible circuit board 22, three piezoelectric driving elements 23 each having two electrode surfaces, two piezoelectric sensing elements 24 each having two electrode surfaces, and two electrical insulation sheets 25.

Two electrode surfaces of two of the three piezoelectric driving elements 23 that have a same polarity are respectively connected to two sides of the conductive sheet 221 mounted between said two piezoelectric driving elements 23.

The electrode surface V+ of each piezoelectric driving element 23 is electrically connected to the power supply module 10 through the multiple conductive sheets 221.

The other electrode surface V− of each piezoelectric driving element 23 is electrically connected to the output terminal of the sensing-phase corrector 30 through the multiple conductive sheets 221. The two electrode surfaces of the two driving sensing elements 24 that have a same polarity are respectively connected to two sides of the conductive sheet 221 mounted between the two piezoelectric sensing elements 24.

The electrode surfaces R+, R− of each piezoelectric sensing element 24 are respectively and electrically connected to the two input terminals of the sensing-phase corrector 30 through the multiple conductive sheets 221. One of the two electrical insulation sheets 25 is mounted between the piezoelectric driving elements 23 and the piezoelectric sensing elements 24. The other electrical insulation sheet 25 is mounted between the two piezoelectric sensing elements 24.

In the fourth preferred embodiment, the electrode surfaces of two of the three piezoelectric driving elements 23 that have a same polarity are respectively connected to two sides of the conductive sheet 221 mounted between said two piezoelectric driving elements 23, such that the directions of the deformation forces working on the three piezoelectric driving elements 23 are the same. Furthermore, the electrode surfaces of the two piezoelectric sensing elements 24 that have a same polarity are respectively connected to two sides of the conductive sheet 221 mounted between the two piezoelectric sensing elements 24, such that the directions of the deformation forces working on the two piezoelectric sensing elements 24 are also the same. Therefore, the deformation forces on the piezoelectric elements 23, 24 do not cancel each other out and the vibration intensity of the tuning fork 21 is maintained.

Figure 3B:
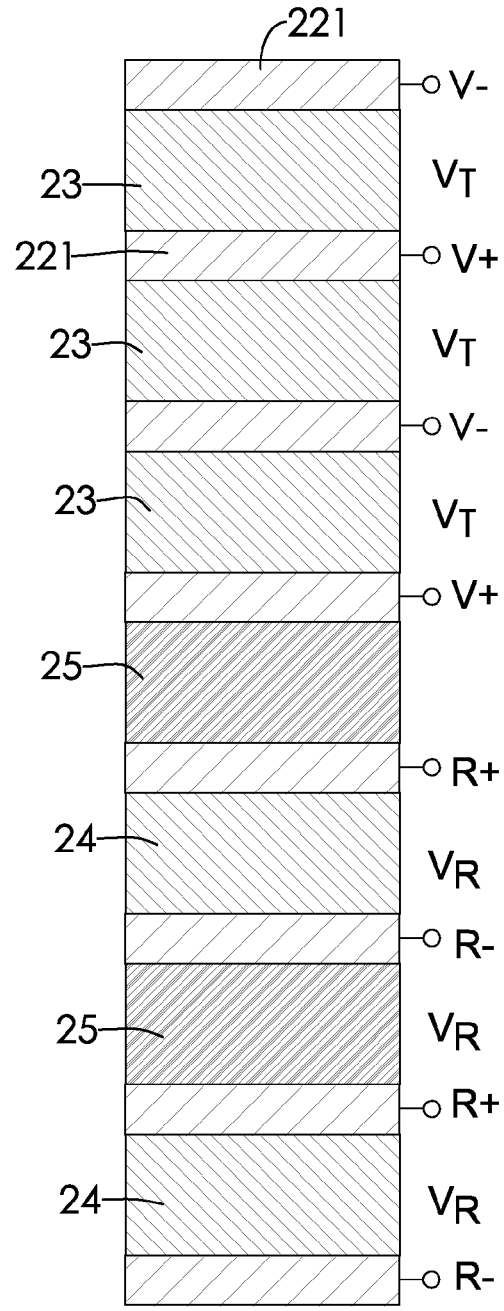
FIG. 3B is a side view in partial section of a fifth embodiment of a tuning fork module of the level transducer in FIG. 1.
Figure 5:
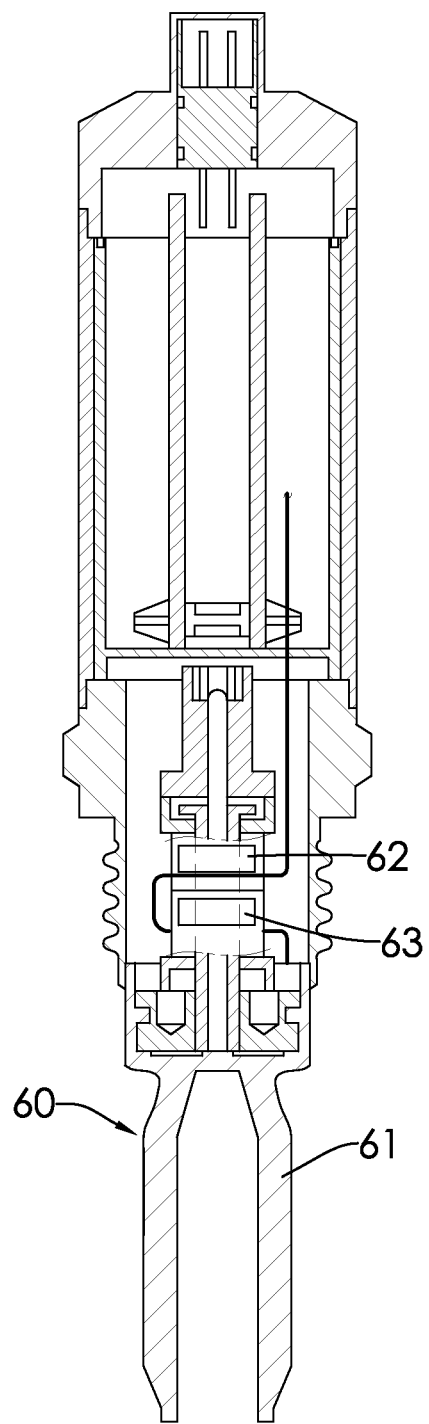
FIG. 5 is a front view in partial section of a conventional level transducer.

In addition, with reference to the FIG. 3B, a fifth preferred embodiment of a tuning fork module 20 of the level transducer in accordance with the present invention is shown. Comparing to the fourth preferred embodiment, three piezoelectric driving elements 23 of the fifth preferred embodiment are reversely connected. A position of the electrode surface V+ of each piezoelectric driving element 23 and a position of the other electrode surface V− of the piezoelectric driving element 23 are exchanged. The above-mentioned objective can also be achieved.

One can obtain quantities of the multiple conductive sheets 221, the at least one piezoelectric driving element 23, the at least one piezoelectric sensing element 24, and the electrical insulation sheet 25 according to a formula:

$$D-1=A+B+C, \text{ wherein } A>B \text{ and } B=C;$$

A represents a quantity of the at least one piezoelectric driving element 23;

B represents a quantity of the at least one piezoelectric sensing element 24;

C represents a quantity of the electrical insulation sheet 25; and

D represents a quantity of the multiple conductive sheets 221.

With reference to FIG. 1, the level transducer in accordance with the present invention may further comprise a user interface 50 having a test unit 51 and a display unit 52. The test unit 51 and the display unit 52 are electrically connected to the controller 40 for users to check and observe whether the level transducer functions normally. The test unit 51 has a built-in standard range and obtains the square wave driving voltage signal $V_T$ and the sensing voltage signal $V_R$. The test unit 51 compares the square wave driving voltage signal $V_T$ and the sensing voltage signal $V_R$ to the standard range. When the square wave driving voltage signal $V_T$ or the sensing voltage signal $V_R$ exceeds the standard range, the test unit 51 produces a warning signal to the display unit 52. The display unit 52 displays the sensing result. When the test unit 51 produces the warning signal, the display unit 52 receives the warning signal and displays a warning.

In conclusion, the power supply module 10 outputs the DC voltage $V_1$ to the electrode surface V+ of the at least one piezoelectric driving element 23, and the sensing-phase corrector 30 outputs the clock signal CLK to the other electrode surface V− of the at least one piezoelectric driving element 23. The voltage difference between the two electrode surfaces V+, V− of the at least one piezoelectric driving element 23 is the square wave driving voltage signal $V_T$. The at least one piezoelectric driving element 23 is driven by the square wave driving voltage signal $V_T$ and vibrates. The tuning fork 21 is inserted in the stored material and also vibrates with the at least one piezoelectric driving element 23. The vibration frequency of the tuning fork 21 is based on the nature and the level of the stored material. The at least one piezoelectric sensing element 24 is extruded by the at least one piezoelectric driving element 23 and outputs the sine wave sensing voltage signal $V_R$. The sensing-phase corrector 30 obtains the sine wave sensing voltage signal $V_R$, and outputs the clock signal CLK based on the sine wave sensing voltage signal $V_R$ to feedback control the frequency of the square wave driving voltage signal $V_T$ on the at least one piezoelectric driving element 23. The controller 40 calculates the sensing result based on the square wave driving voltage signal $V_T$ on the at least one piezoelectric driving element 23, the reversed sensing voltage signal $V_2$ produced by the differential amplifier 311 of the sensing-phase corrector 30, and the clock signal CLK produced by the phase shifter 32. The sensing result can be displayed on the display unit 52 of the user interface 50. In addition, the phase difference between the square wave driving voltage signal $V_T$ and the sine wave sensing voltage signal $V_R$ is 90 degrees. Therefore, the deformation forces working on the at least one piezoelectric driving element 23 and the at least one piezoelectric sensing element 24 are in same direction, and only when the deformation forces are depleted, the at least one piezoelectric driving element 23 and the at least one piezoelectric sensing element 24 obtain deformation forces in reverse directions. Therefore, the deformation forces working on the at least one piezoelectric driving element 23 and the at least one piezoelectric sensing element 24 are not counteracted by the deformation forces in reverse directions, such that the accuracy of the sensing result is increased.

What is claimed is:

1. A high accuracy level transducer comprising:
   a power supply module producing an adjustable DC voltage;
   a tuning fork module having
      a tuning fork;
      at least one piezoelectric driving element mounted on the tuning fork, wherein each one of the at least one piezoelectric driving element has
         two electrode surfaces, wherein one of the two electrode surfaces is electrically connected to the power supply module, wherein a voltage between the two electrode surfaces is a square wave driving voltage signal; and
      at least one piezoelectric sensing element mounted on the tuning fork and stacked with the at least one piezoelectric driving element, wherein each one of the at least one piezoelectric sensing element has
         two electrode surfaces; and
         wherein when the at least one piezoelectric driving element deforms, the at least one piezoelectric sensing element outputs a sine wave sensing voltage signal;
   a sensing-phase corrector electrically connected to the tuning fork module and having
      a sine wave signal processor, wherein the sine wave signal processor produces a reversed sensing voltage signal based on the sine wave sensing voltage signal;
      a phase shifter; and
      wherein the sensing-phase corrector obtains the sine wave sensing voltage signal and outputs a clock signal based on the sine wave sensing voltage signal to the other electrode surface of the at least one piezoelectric driving element, wherein a phase difference between the sine wave sensing voltage signal and the clock signal is 90 degrees; and
   a controller electrically connected to the power supply module, the tuning fork module and the sensing-phase corrector, and having a calculation function, wherein the controller obtains a sensing result based on the square wave driver voltage signal on the at least one piezoelectric driving element, the reversed sensing voltage signal produced by the sine wave signal processor and the clock signal produced by the sensing-phase corrector.

2. The level transducer as claimed in claim 1, wherein the tuning fork module further comprises
   a flexible circuit board electrically connected to the power supply module and the sensing-phase corrector, and folded wavy to form multiple creases, wherein the flexible circuit board has
      multiple conductive sheets respectively mounted on sides of the multiple creases, and electrically connected to the at least one piezoelectric driving element and the at least one piezoelectric sensing element; and
   at least one electrical insulation sheet mounted between the at least one piezoelectric driving element and the at least one piezoelectric sensing element.

3. The level transducer as claimed in claim 2, wherein quantities of the multiple conductive sheets, the at least one piezoelectric driving element, the at least one piezoelectric sensing element, and the at least one electrical insulation sheet can be obtained according to a formula:

$$D-1=A+B+C, \text{ wherein } A>B \text{ and } B=C; \text{ wherein}$$

A represents a quantity of the at least one piezoelectric driving element;
B represents a quantity of the at least one piezoelectric sensing element;
C represents a quantity of the at least one electrical insulation sheet; and
D represents a quantity of the multiple conductive sheets.

4. The level transducer as claimed in claim 3, wherein the tuning fork module comprises
   two piezoelectric driving elements each having two electrode surfaces, wherein two of the electrode surfaces that have a same polarity are respectively connected to two sides of the conductive sheet mounted between the two piezoelectric driving elements.

5. The level transducer as claimed in claim 3, wherein the tuning fork module comprises
three piezoelectric driving elements each having two electrode surfaces, wherein the electrode surfaces of two of the three piezoelectric driving elements that have a same polarity are respectively connected to two sides of the conductive sheet mounted between said two piezoelectric driving elements.

6. The level transducer as claimed in claim 3, wherein the tuning fork module comprises
three piezoelectric driving elements each having two electrode surfaces, wherein the electrode surfaces of two of the three piezoelectric driving elements that have a same polarity are respectively connected to two sides of the conductive sheet mounted between said two piezoelectric driving elements;
two piezoelectric sensing elements each having two electrode surfaces, wherein two of the electrode surfaces that have a same polarity are respectively connected to two sides of the conductive sheet mounted between the two piezoelectric sensing elements; and
two electrical insulation sheets, wherein one of the two electrical insulation sheets is mounted between the piezoelectric driving elements and the piezoelectric sensing elements, and the other electrical insulation sheet is mounted between the two piezoelectric sensing elements.

7. The level transducer as claimed in claim 1, wherein the sine wave signal processor comprises:
a differential amplifier electrically connected to the at least one piezoelectric sensing element and the controller, and obtaining the sine wave sensing voltage signal, wherein the differential amplifier outputs the reversed sensing voltage signal to the controller;
a filter electrically connected to the differential amplifier and obtaining the reversed sensing voltage signal; and
an amplifier electrically connected to the filter and outputting a square wave signal; and
wherein the phase shifter is electrically connected to the amplifier and obtains the square wave signal, and then outputs the clock signal based on the square wave signal.

8. The level transducer as claimed in claim 2, wherein the sine wave signal processor comprises:
a differential amplifier electrically connected to the at least one piezoelectric sensing element and the controller, and obtaining the sine wave sensing voltage signal, wherein the differential amplifier outputs the reversed sensing voltage signal to the controller;
a filter electrically connected to the differential amplifier and obtaining the reversed sensing voltage signal; and
an amplifier electrically connected to the filter and outputting a square wave signal; and
wherein the phase shifter is electrically connected to the amplifier and obtains the square wave signal, and then outputs the clock signal based on the square wave signal.

9. The level transducer as claimed in claim 3, wherein the sine wave signal processor comprises:
a differential amplifier electrically connected to the at least one piezoelectric sensing element and the controller, and obtaining the sine wave sensing voltage signal, wherein the differential amplifier outputs the reversed sensing voltage signal to the controller;
a filter electrically connected to the differential amplifier and obtaining the reversed sensing voltage signal; and
an amplifier electrically connected to the filter and outputting a square wave signal; and
wherein the phase shifter is electrically connected to the amplifier and obtains the square wave signal, and then outputs the clock signal based on the square wave signal.

10. The level transducer as claimed in claim 4, wherein the sine wave signal processor comprises:
a differential amplifier electrically connected to the at least one piezoelectric sensing element and the controller, and obtaining the sine wave sensing voltage signal, wherein the differential amplifier outputs the reversed sensing voltage signal to the controller;
a filter electrically connected to the differential amplifier and obtaining the reversed sensing voltage signal; and
an amplifier electrically connected to the filter and outputting a square wave signal; and
wherein the phase shifter is electrically connected to the amplifier and obtains the square wave signal, and then outputs the clock signal based on the square wave signal.

11. The level transducer as claimed in claim 5, wherein the sine wave signal processor comprises:
a differential amplifier electrically connected to the at least one piezoelectric sensing element and the controller, and obtaining the sine wave sensing voltage signal, wherein the differential amplifier outputs the reversed sensing voltage signal to the controller;
a filter electrically connected to the differential amplifier and obtaining the reversed sensing voltage signal; and
an amplifier electrically connected to the filter and outputting a square wave signal; and
wherein the phase shifter is electrically connected to the amplifier and obtains the square wave signal, and then outputs the clock signal based on the square wave signal.

12. The level transducer as claimed in claim 6, wherein the sine wave signal processor comprises:
a differential amplifier electrically connected to the two piezoelectric sensing elements and the controller, and obtaining the sine wave sensing voltage signals, wherein the differential amplifier outputs the reversed sensing voltage signal to the controller;
a filter electrically connected to the differential amplifier and obtaining the reversed sensing voltage signal; and
an amplifier electrically connected to the filter and outputting a square wave signal; and
wherein the phase shifter is electrically connected to the amplifier and obtains the square wave signal, and then outputs the clock signal based on the square wave signal.

13. The level transducer as claimed in claim 1 further comprising:
a test unit electrically connected to the controller and having a built-in standard range, wherein the test unit obtains the square wave driving voltage signal and the sensing voltage, and compares the square wave driving voltage signal and the sensing voltage signal to the standard range, and when the square wave driving voltage signal or the sensing voltage signal exceeds the standard range, the test unit produces a warning signal; and
a display unit electrically connected to the controller and the test unit, wherein the display unit displays the sensing result on the display unit, and when the test unit produces the warning signal, the display unit receives the warning signal and displays a warning.

14. The level transducer as claimed in claim 2 further comprising:
a test unit electrically connected to the controller and having a built-in standard range, wherein the test unit obtains the square wave driving voltage signal and the sensing voltage signal, and compares the square wave driving voltage signal and the sensing voltage signal to the standard range, and when the square wave driving voltage signal or the sensing voltage signal exceeds the standard range, the test unit produces a warning signal; and a display unit electrically connected to the controller and the test unit, wherein the display unit displays the sensing result on the display unit, and when the test unit produces the warning signal, the display unit receives the warning signal and displays a warning.

15. The level transducer as claimed in claim 3 further comprising:

a test unit electrically connected to the controller and having a built-in standard range, wherein the test unit obtains the square wave driving voltage signal and the sensing voltage signal, and compares the square wave driving voltage signal and the sensing voltage signal to the standard range, and when the square wave driving voltage signal or the sensing voltage signal exceeds the standard range, the test unit produces a warning signal; and a display unit electrically connected to the controller and the test unit, wherein the display unit displays the sensing result on the display unit, and when the test unit produces the warning signal, the display unit receives the warning signal and displays a warning.

16. The level transducer as claimed in claim 7 further comprising:

a test unit electrically connected to the controller and having a built-in standard range, wherein the test unit obtains the square wave driving voltage signal and the sensing voltage signal, and compares the square wave driving voltage signal and the sensing voltage signal to the standard range, and when the square wave driving voltage signal or the sensing voltage signal exceeds the standard range, the test unit produces a warning signal; and a display unit electrically connected to the controller and the test unit, wherein the display unit displays the sensing result on the display unit, and when the test unit produces the warning signal, the display unit receives the warning signal and displays a warning.

17. The level transducer as claimed in claim 8 further comprising:

a test unit electrically connected to the controller and having a built-in standard range, wherein the test unit obtains the square wave driving voltage signal and the sensing voltage signal, and compares the square wave driving voltage signal and the sensing voltage signal to the standard range, and when the square wave driving voltage signal or the sensing voltage signal exceeds the standard range, the test unit produces a warning signal; and a display unit electrically connected to the controller and the test unit, wherein the display unit displays the sensing result on the display unit, and when the test unit produces the warning signal, the display unit receives the warning signal and displays a warning.

18. The level transducer as claimed in claim 9 further comprising:

a test unit electrically connected to the controller and having a built-in standard range, wherein the test unit obtains the square wave driving voltage signal and the sensing voltage signal, and compares the square wave driving voltage signal and the sensing voltage signal to the standard range, and when the square wave driving voltage signal or the sensing voltage signal exceeds the standard range, the test unit produces a warning signal; and a display unit electrically connected to the controller and the test unit, wherein the display unit displays the sensing result on the display unit, and when the test unit produces the warning signal, the display unit receives the warning signal and displays a warning.

19. The level transducer as claimed in claim 1, wherein the power supply module further comprises multiple DC-to-DC converters.

20. The level transducer as claimed in claim 18, wherein the power supply module further comprises multiple DC-to-DC converters.

* * * * *